H. M. FRANZEN.
AEROPLANE.
APPLICATION FILED AUG. 7, 1920.

1,382,772.

Patented June 28, 1921
2 SHEETS—SHEET 1.

INVENTOR.
Henry M. Franzen
BY
ATTORNEY

H. M. FRANZEN.
AEROPLANE.
APPLICATION FILED AUG. 7, 1920.
1,382,772.  Patented June 28, 1921.
2 SHEETS—SHEET 2.
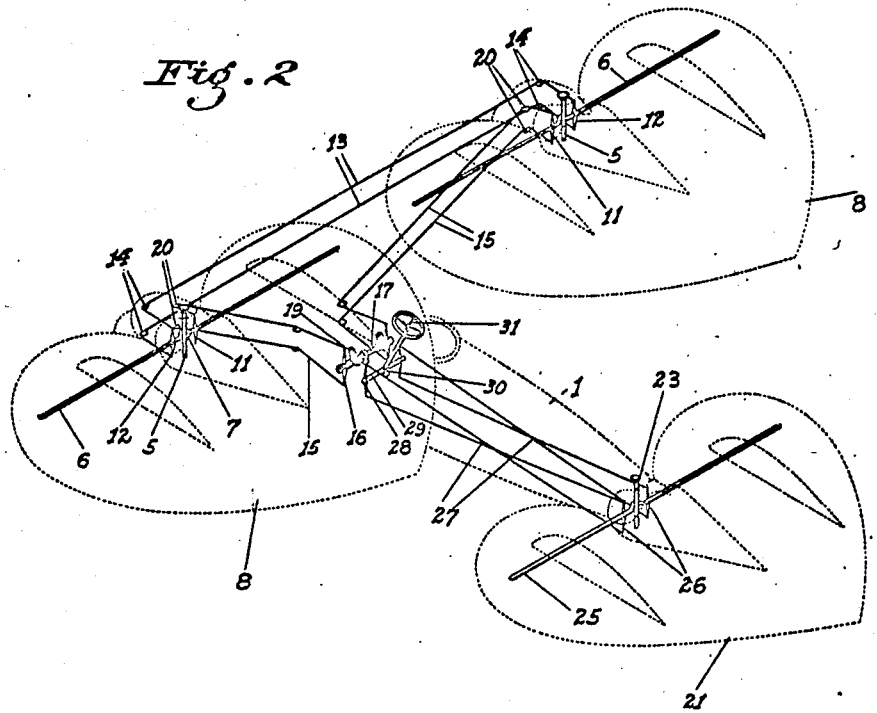
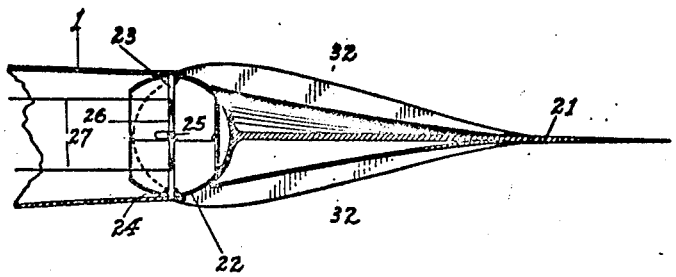
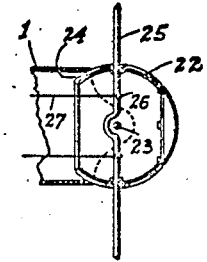
INVENTOR.
Henry M. Franzen
BY
ATTORNEY

UNITED STATES PATENT OFFICE.

HENRY M. FRANZEN, OF LOS ANGELES, CALIFORNIA.

AEROPLANE.

1,382,772.             Specification of Letters Patent.     Patented June 28, 1921.

Application filed August 7, 1920. Serial No. 401,922.

*To all whom it may concern:*

Be it known that I, HENRY M. FRANZEN, a citizen of the United States, residing at Los Angeles, in the county of Los Angeles, State of California, have invented certain new and useful Improvements in Aeroplanes; and I do declare the following to be a full, clear, and exact description of the same, reference being had to the accompanying drawings and to the characters of reference marked thereon, which form a part of this application.

This invention relates to improvements in air craft of the heavier-than-air type, the principal object being to provide supporting surfaces for the aeroplane so arranged and constructed that the steering of the same to move it in a vertical or horizontal plane is accomplished by suitable movements of the supporting surfaces themselves in corresponding directions.

To accomplish this end, the horizontal wing surfaces are provided with vertical fins, which serve as rudders, the supporting surfaces being universally mounted to the fuselage.

A second object is to so mount these surfaces and connect the same to the fuselage that they are practically counterbalanced, doing away with the necessity of exterior struts and braces, thus of course lessening the air-friction surface.

By thus having the wings substantially counterbalanced of themselves, the control thereof is more easily accomplished.

The supporting surfaces consist of a pair of independently mounted monoplane wings at the forward end of the fuselage, and an independent tail surface at the rear of the fuselage, the wings and tail being all provided with the vertical fins heretofore referred to.

In order to maneuver the aeroplane so that it may readily turn in any direction, and so that it may also be used for "stunt" flying, I have provided a common control means for the wings whereby they may be turned simultaneously about their vertical axes in a horizontal plane, and at the same time, both together or independently, moved about their horizontal axes in a vertical plane.

There is also an independent control means for moving the tail in any direction about its universal connection, so that the wings may be elevated and the tail depressed, or vice versa, and similarly the wings may be swung laterally to one side while the tail is swung to either one side or the other, making it possible to make very short turns, and also perform the various "stunts" used in the war time and in exhibition and spectacular flying.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar character of reference indicate corresponding parts in the several views.

Fig. 2 is a diagrammatic layout of the control means, the aeroplane structure being outlined therewith.

Fig. 3 is an enlarged sectional view of the tail end of the machine.

Fig. 4 is a fragmentary plan section of the tail universal joint.

Figure 1:
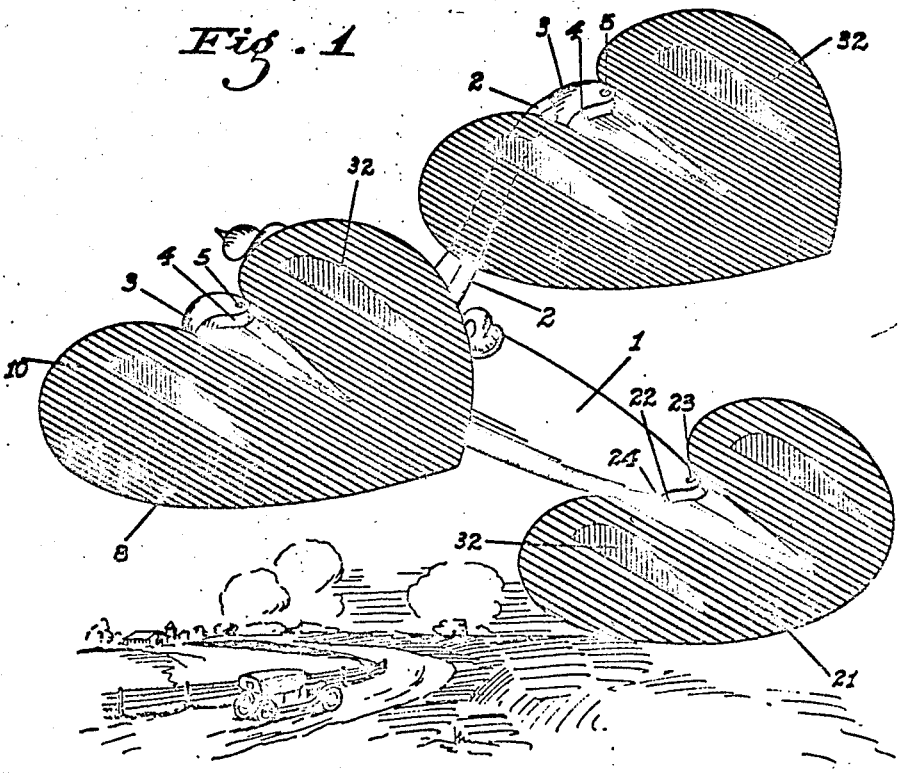
Figure 1 is a perspective elevation of my improved aeroplane.
Figure 5:
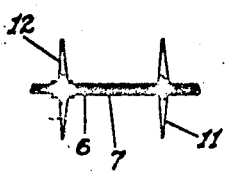
Fig. 5 is a detached view of a wing-control shaft.
Figure 6:
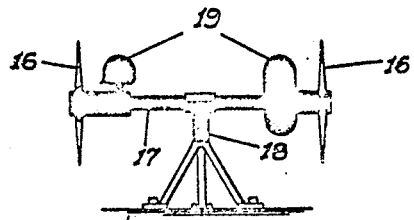
Fig. 6 is a similar view of a pedal mechanism for actuating the wing-shaft.

Referring now more particularly to the characters of reference on the drawings, the numeral 1 denotes the fuselage, adjacent the forward end of which and transversely thereof is a tubular support 2 fixed to the fuselage and extending in an upward curve on each side thereof. At the outer ends of the support are socket members 3 in which are turnably mounted hollow balls 4, forming a stream-line therewith, and being pivoted thereto on a vertical axis as at 5. Turnably mounted on a horizontal plane in each ball is a shaft 6, intersecting the vertical axis 5 and being bent therearound as at 7 to avoid the same.

Thus a universal joint is formed. Fixed to each shaft 7 is a wing member 8, the wing extending to each side of the axis 5 transversely of the fuselage, and having its surface on each side thereof projecting forward of the shaft 7 a certain distance as shown at 10, so that the wings are substantially counterbalanced by the air pressures to remain in a fixed plane relative to the fuselage, so that the moving of the wings, whereby the direction of movement of the aeroplane is partly controlled, is made an easy matter, and the necessity of numerous guy wires and struts is eliminated.

The shafts 6 extend almost the full width of the wings, so as to add rigidity thereto, the wings being spaced apart a certain distance.

On each shaft 6 are a pair of cross arms 11 and 12 normally vertical and spaced an even distance on each side of the axis 5, being concealed in the balls 4. The arms 11 on the two shafts are adjacent each other and are fixed to the shafts, while the arms 12 are turnable thereon, while it is to be understood that both pairs of cross arms terminate at equal distances above and below the shafts 6.

The upper and lower ends of the arms 12 are connected by corresponding cables 13, which are passed over pulleys 14 suitably arranged to impart a fore and aft movement to the arms when caused to be moved. These cables are preferably concealed in the tubular support 2, so as to be out of sight and not be acted on by the air, but I have shown them as extending straight across in the diagrammatic Fig. 2, for the sake of clearness of illustration.

From the ends of the arms 11, cables 15 extend through the support 2 to the corresponding ends of vertical arms 16 each independently and turnably mounted on a horizontal shaft 17 which itself is pivoted to the fuselage in a vertical plane as shown at 18 for horizontal swinging movement, each arm member 16 being provided with a pedal 19.

Thus it will be seen that if either pedal is acted on to turn the shaft 17 and move the corresponding arm 16 in a fore-and-aft direction, the corresponding arm 11 will likewise be moved, the shaft 6 will be turned, and the wing fixed thereto will of course move in a horizontal plane about the connection of the shaft with the ball as an axis. The cables 15 of course pass over pulleys 20 placed ahead of the arms 11 and wherever else it is necessary, so as to impart fore-and-aft movement thereto with a pull on the cables. The movement just described is independent for each wing, since each one is separately mounted, and the pedal controls are each turnably mounted on the shaft 17. At the same time no movement of the arms 12 takes place, since they are turnable on the shaft 6 and merely maintain their upright position.

If however, the shaft 17 is turned in a horizontal plane about its vertical pivot 18, both cables 15 of either one of the arms 16 will be pulled in unison in the same direction, and will act to similarly pull the corresponding arm 11 and the shaft 6 fixed thereto about the vertical axis of the ball, thus moving the wing attached thereto in a horizontal plane.

At the same time the opposite arm 12 is likewise moved by the turning of the shaft 6, and this movement pulls on both cables 13 simultaneously, causing the arm 12 on the other wing to be pulled about the vertical pivot of that wing as an axis, and thus moving said wing in a horizontal plane in the same direction as the other wing, and to the same extent. It will be noted however that even when the wings are thus turned, they may also be independently tilted in either direction by suitable manipulation of the corresponding pedals, thus providing for universal movement of the wings under all conditions.

I also provide a tail member 21 which is connected to the rear end of the fuselage in central alinement therewith by reason of a hollow ball 22, similar to the members 4, mounted on a vertical axis 23 in a socket 24 in the fuselage. A horizontal transverse shaft 25 is turnably mounted in the ball, and intersects the axis 23, this shaft extending transversely of the tail and fixed thereto against turning. Arms 26 are fixed to the shaft 25 on each side of the axis 24, and have cables 27 extending from both ends thereof to corresponding arms 28 fixed on a transverse shaft 29, pivotally mounted to the fuselage on a vertical ball and socket joint as at 30, and positioned slightly to the rear of the shaft 17.

A lever, stick or hand wheel member 31 is fixed to the shaft 29 in line with the central joint, so that by moving said lever fore and aft, or turning the same around, the tail member will be tilted in one direction or the other, or may be moved in a horizontal plane about the vertical pivotal connection 23 as an axis.

Since the wings and tail are adapted to be thus moved, steering of the aeroplane may be accomplished thereby, and for this reason the wings and tail are provided with integral and rigid vertical and longitudinal fins or rudders 32, positioned in alinement both above and below the wings, and equal distances on both sides of the longitudinal center thereof, such fins projecting a certain distance forward of the transverse axis, so as to stabilize the structure, and aid in the promotion of ease of manipulation of the controls.

From the foregoing description it will be readily seen that I have produced such a device as substantially fulfils the object of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:—

1. An aeroplane including a fuselage, horizontal supporting surfaces and vertical fins integral therewith, the supporting surfaces being independently mounted for universal movement relative to the fuselage, and means actuated by the aviator for moving the supporting surfaces.

2. An aeroplane including a fuselage, horizontal supporting surfaces and vertical fins integral therewith, the supporting surfaces being independently mounted for universal movement relative to the fuselage, and means actuated by the aviator for moving the supporting surfaces simultaneously in a horizontal plane about their universal connections while at the same time allowing each supporting surface to be independently moved in a vertical plane about such universal connections.

3. An aeroplane comprising a fuselage, horizontal and transversely alined and independent wings, a universal joint for each wing, a supporting member fixed to the fuselage and connected to the stationary members of the joints, and means operatively connected with the movable members of the joints, and actuated at will by the aviator for moving the wings simultaneously in a horizontal plane relative to the fuselage and at the same time independently of each other in a vertical plane, with the universal joints as the axis.

4. An aeroplane comprising a fuselage, horizontal and transversely alined and independent wings, a supporting member fixed to the fuselage and projecting on each side thereof, a universal joint member mounted in each end of the support on a vertical axis, the wing corresponding being mounted to the joint on a horizontal axis intersecting the vertical axis, and means for moving the joint about its vertical axis and the wing simultaneously about its horizontal axis with the joint.

5. An aeroplane comprising a fuselage, horizontal and transversely alined and independent wings, a supporting member fixed to the fuselage and projecting on each side thereof, a ball mounted in each end of the support on a vertical axis, the wing corresponding being mounted to the ball on a horizontal axis intersecting the vertical axis, and a commonly actuated means for moving the ball about its vertical axis and simultaneously moving the wing about its horizontal axis.

6. An aeroplane comprising a fuselage, transverse and independent monoplane surfaces, a tail, a universal joint connection between each supporting surface and the fuselage, a common means for moving the monoplane surfaces about their universal connections, and independent means for moving the tail independently of the monoplane surfaces.

7. An aeroplane comprising a fuselage, horizontal and transversely alined and independent wings, a supporting member fixed to the fuselage and projecting on each side thereof, a ball mounted in each end of the support on a vertical axis, the wing corresponding being mounted to the ball on a horizontal axis intersecting the vertical axis, and concealed cables for holding the wings in fixed positions relative to the fuselage, whereby exterior braces are eliminated, the cables being operatively connected to be manipulated to move the wings about their axis.

8. An aeroplane comprising a fuselage, horizontal and transversely alined and independent wings, a supporting member fixed to the fuselage and projecting on each side thereof, a ball mounted in each end of the support on a vertical axis, the wing corresponding being mounted to the ball on a horizontal axis intersecting the vertical axis, a shaft forming such horizontal axis turnable in the ball but fixed to the wing against turning, arms projecting at right angles to said shaft on each side of the vertical axis, and cables operatively connected to the arms and adapted to be moved to turn, the shaft and the wing fixed thereto in a vertical plane, and to independently move the shaft about the vertical axis in a horizontal plane.

9. An aeroplane comprising a fuselage, horizontal and transversely alined and independent wings, a supporting member fixed to the fuselage and projecting on each side thereof, a ball mounted in each end of the support on a vertical axis, the wing corresponding being mounted to the ball on a horizontal axis, intersecting the vertical axis, a shaft forming such horizontal axis turnable in the ball but fixed to the wing against turning, arms projecting at right angles to said shaft on each side of the vertical axis, cables operatively connected to the arms and extending to the fuselage, and means therein connected to the cables and actuated by the aviator whereby the cables may be manipulated to turn the shaft and the wing fixed thereto through a vertical arc, and to independently swing the shaft and wing about the vertical axis.

10. An aeroplane comprising a fuselage, horizontal and transversely alined and independent wings, a tubular supporting member projecting from the fuselage on each side thereof and fixed thereto, a hollow ball mounted in each end of the support on a vertical axis and forming a stream-line junction therewith, a wing mounted to each ball on a horizonal axis intersecting the vertical axis, a shaft forming each such horizontal axis turnably mounted in the corresponding ball but fixed to the wing against turning, arms fixed on said shaft on each side of the vertical axis, and cables operatively connected to the arms and passing through the tubular support to the fuselage and arranged to both hold the wings in a fixed position relative to the fuselage and to be moved to turn the wings universally about their axes.

11. An aeroplane comprising a fuselage, tubular supporting members projecting from the fuselage transversely thereof, wings mounted for universal movement at the outer ends of the supports, and control means for the wings extending through the tubular members and concealed therein.

12. An aeroplane comprising a fuselage, tubular supporting members projecting from the fuselage transversely thereof, a hollow ball at the outer ends of each support, mounted thereto on vertical axes, wings mounted to the balls on horizontal axes, and control means passing through the tubular supports and into the balls and connected to the shafts for moving and holding the wings.

13. An aeroplane including a fuselage transverse supports projecting upwardly at a diverging angle from each side of the fuselage, a wing for each support, a universal joint connection between each wing and support, and stream-line hoods substantially covering said joints and fixed to the wings, the latter extending rearwardly of the joints.

14. An aeroplane including a fuselage, transverse and tubular supports projecting upwardly from the fuselage on each side thereof, a ball socketed in the outer end of each support and pivoted thereto on a vertical axis, a wing for each ball pivoted thereto on a horizontal plane, and a hood fixed to the wing and extending to the ball to lie substantially in streamline continuation thereof.

In testimony whereof I affix my signature.

HENRY M. FRANZEN.